United States Patent [19]

Torrance

[11] Patent Number: 4,545,145
[45] Date of Patent: Oct. 8, 1985

[54] LIQUID TRANSFER DEVICE

[75] Inventor: Donald M. Torrance, Gladstone Rd., Masterton, New Zealand

[73] Assignees: Donald MacNeil Torrance; Mathew Barbour, both of Masterton, New Zealand

[21] Appl. No.: 471,748

[22] Filed: Mar. 3, 1983

[30] Foreign Application Priority Data

Mar. 3, 1982 [NZ] New Zealand .................. 199893

[51] Int. Cl.$^4$ ............................................. A01G 29/00
[52] U.S. Cl. ..................................................... 47/48.5
[58] Field of Search ................. 604/403; 47/48.5, 27, 47/31, 32

[56] References Cited

U.S. PATENT DOCUMENTS

| 2,875,713 | 3/1959 | Shoffner | 47/48.5 |
| 3,535,822 | 10/1970 | Fruth et al. | 47/1.5 |
| 3,860,172 | 1/1975 | Platt | 47/48.5 |
| 4,115,951 | 9/1978 | Becker et al. | 47/48.5 |
| 4,294,250 | 10/1981 | Dennehey | 604/403 |
| 4,336,666 | 6/1982 | Caso | 47/48.5 |

Primary Examiner—Robert A. Hafer
Assistant Examiner—Bradley M. Lewis
Attorney, Agent, or Firm—Burns, Doane, Swecker & Mathis

[57] ABSTRACT

A tube 22 contains a liquid absorbent material 28, an end portion of which can be immersed in the liquid contained within a bag 20 positioned about a tree 30 and transfer the liquid at a rate dependant on the attitude of the tube 22 to the end 27 of the tube 22 inserted in the ground adjacent the root structure 31 of the tree 30.

4 Claims, 6 Drawing Figures

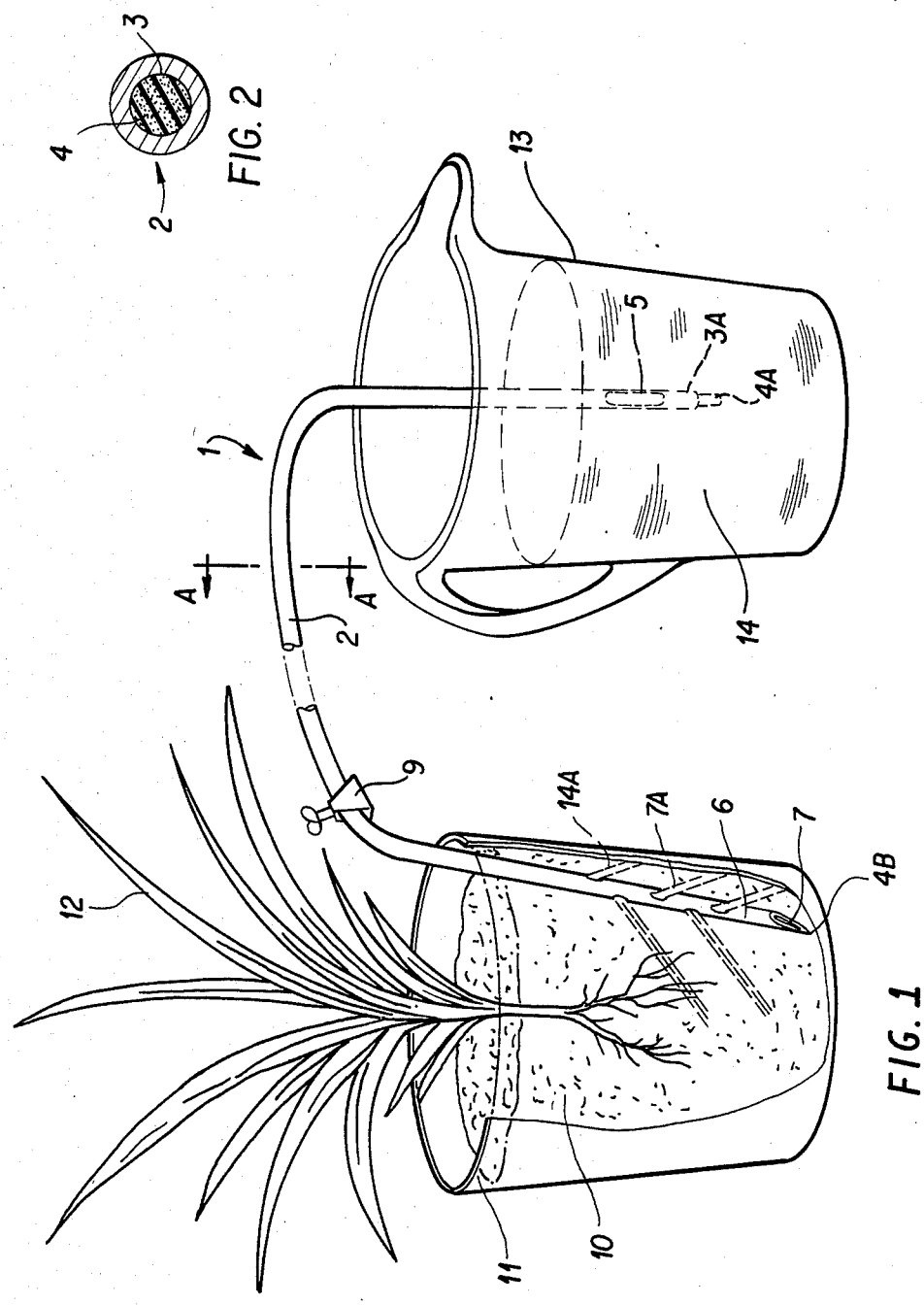

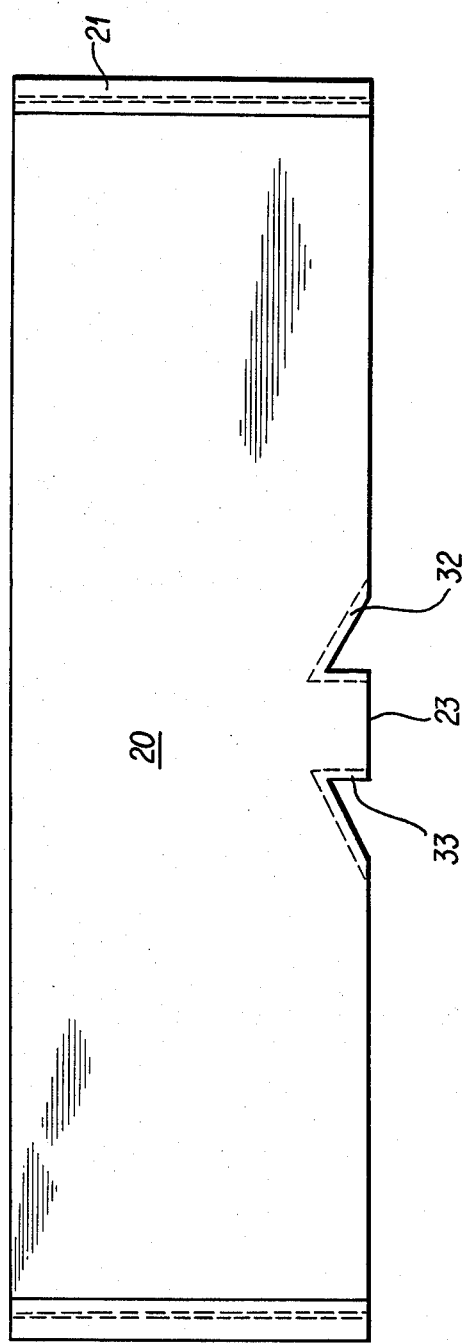

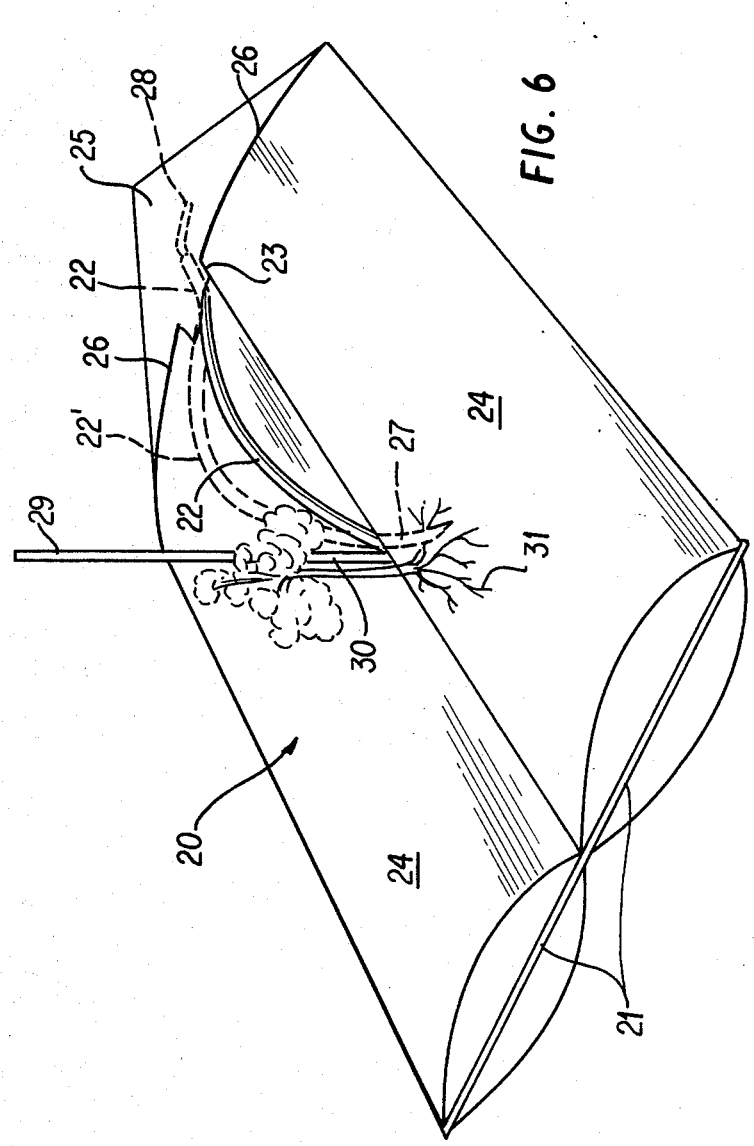

LIQUID TRANSFER DEVICE

BACKGROUND OF THE INVENTION

This invention relates to a liquid transfer device and more particularly but not exclusively to the transfer of a liquid such as water from a supply source or a liquid reservoir to a desired place for receiving the liquid.

The present invention will be hereinafter described for convenience only, solely in respect of the transfer of water in agricultural and domestic applications for watering of trees and other plants, being the preferred application of the invention, but it is to be understood that other liquids could be similarly transferred where required and as appropriate.

Generally, the application of water in the feeding of trees and plants has been done in the past through mechanical means such as pumps, sprays and the like and by trickle feed apparatus including conduits with small outlets, orifices or valves. Such previous arrangements have involved substantial costs and generally inefficient water flow due to contamination or solids in the water blocking or adversely affecting the water channels or outlets. Trickle feed systems, if not pump assisted, generally also require an appropriate head of water for effective operation.

It is thus an object of a particular embodiment of the invention to provide a water transfer tube which is able to transfer water from a supply source or reservoir to wherever required and to be able to do this regardless of the level of the reservoir relative to the transfer area and without priming if the reservoir runs dry and is then re-filled.

It is an object of another particular embodiment of the invention to provide a water reservoir adapted for placement about trees or shrubs which together with the water transfer tube of the present invention enable a controlled and automatic watering of the tree or shrub.

SUMMARY OF THE INVENTION

According to one embodiment of the present invention there is thus provided a liquid transfer device comprising an elongate tubular member of a liquid impermeable material and an inner continuous length of an absorbent or hydrophilic material extending between liquid inlet and liquid outlet end portions of said tubular member such that with said absorbent or hydrophilic material at said liquid inlet portion immersed in a liquid said liquid will be transferred along said absorbent or hydrophilic material to said liquid outlet end portion.

According to another embodiment of the present invention there is provided a liquid reservoir comprising an elongate bag to contain and retain a predetermined volume of liquid, said bag being foldable to define a pair of legs which extend about a plant or shrub and an access means into the interior of said bag to enable said bag to be filled and to allow the controlled flow of liquid therefrom.

BRIEF DESCRIPTION OF THE DRAWINGS

The present invention will now be described by way of example and with reference to the accompanying drawings wherein;

FIG. 1: shows, diagrammatically, a part-exploded view of one embodiment of the present invention in use in providing an automatic watering of a plant;

FIG. 2: shows, diagrammatically, a cross-sectional view of the tube of FIG. 1 along arrows A—A;

FIG. 3: shows, diagrammatically, a plan perspective view of a liquid reservoir according to another embodiment of the invention;

FIG. 6: shows, diagrammatically, the reservoir and tube of FIGS. 3 to 5 in use in providing an automatic watering of a tree or shurb.

BRIEF DESCRIPTION OF THE PREFERRED EMBODIMENT

Figure 4:
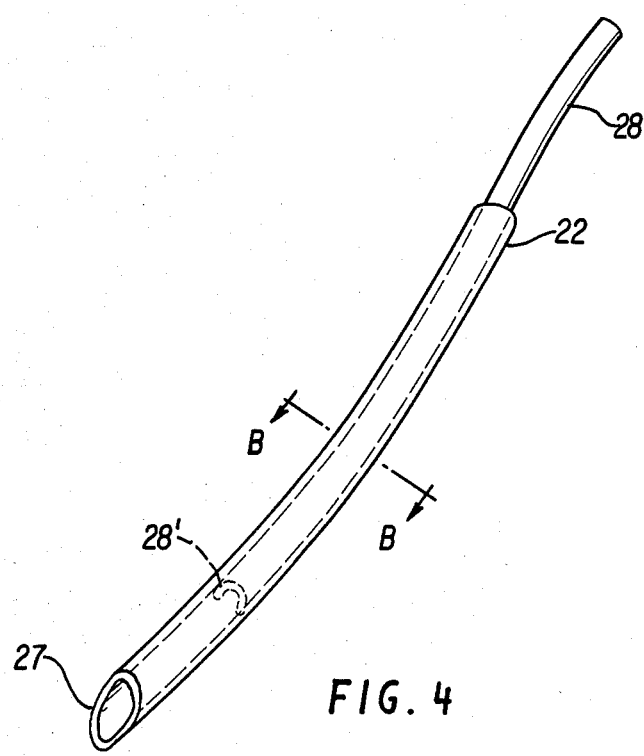
FIG. 4: shows, diagrammatically, a liquid transfer tube according to another embodiment of the invention and suitable for use with the water reservoir of FIG. 3.

It will be apparent to those skilled in the art that the present invention has numerous applications particularly in the agricultural or horticultural field but also would have many other uses both domestic and industrial wherever a controlled automatic flow of a liquid between two points were required.

However, the present invention will for simplicity be described particularly in respect of its use in supplying water at a controlled rate for the feeding of trees, shrubs or plants.

In this use, the present invention is able to supply water automatically at a controlled rate from a reservoir such that if required plants, trees, shrubs and the like can be left unattended for considerable periods of time.

Moreover, the present invention enables the water to be fed directly to the roots of the plant thus increasing the efficiency of water use whilst also providing an automatic filtering effect as the water is transferred from source to discharge points.

Referring firstly to FIGS. 1 and 2 of the accompanying drawings a liquid transfer tube 1 according to one embodiment of the invention is referenced generally by arrow 1. It is seen to comprise a length of tube 2 having an outer tubular layer 3 of a water impermeable material, for example plastics or metal, enclosing a continuous length of a water absorbent core which is sponge or sponge-like material.

The water absorbent material 4 can be inserted into the tube 3 in a compressed and dried form. Alternatively the tube 3 may be formed about the material 4 by a suitable extrusion, spraying or other suitable technique.

An end 3A of the tube 3 is shown inserted into water 14 contained within a reservoir 13, a portion 4A of the material 4 being shown extending outside the end 3A of the tube 3. One or more apertures 5 can be provided in the tube 3 to also provide access of the water 14 to the material 4. The water 14 will thus be absorbed by the absorbent material 4 and the water will then be transferred to the opposite end 6 of the tube 3. With the reservoir 13 fairly full the water will not have to be lifted a great height but transfer of water even when the level of water 14 in the reservoir 13 has dropped can continue due to the siphoning effect which will be set up.

If the flow of water through the tube 2 is required to be reduced or terminated a valve 9 can be used to apply pressure on the tube 2 to thus close off or restrict the water supply. The valve 9 is shown as comprising a screw or bolt which can be screwed down to apply pressure on the outer tube 3 and hence to the water absorbent core 4.

The end 6 of the tube 3 is shown with a sharpened end 7 which facilitates its insertion into soil 10 of a plant container 11.

The end 6 of the tube 3 can have a plurality of apertures 7A through which water 14A is shown discharging into the soil 10 adjacent the roots of the plant 12. Alternatively the apertures 7A could be omitted and water merely allowed to egress from the core material 4B at the end 6 of the tube 3.

If used, the control valve 9 would usually be positioned below the lowest point of the water in the reservoir 13.

As the rate of flow of water through the tube 2 can be readily controlled by raising or lowering the tube 2 relative to the reservoir 13 then the valve 9 may in many instances be omitted.

If a transparent reservoir 13 is used then a simple check of the water level therein is all that is needed to confirm that a plant connected thereto by the tube 2 is being watered. A common source or reservoir for the water 14 such as a tank, trough, water reticulation system or the like can be used whereby plants of various sizes or various stages of development can be fed varying amounts of water or other desired liquid or mixtures thereof. As well as the control of the water flow being by means of a valve 9 and/or the raising or lowering of the tube 2, control can also be provided by the use of tubes 3 and/or cores 4 of different diameters and/or cores 4 of different absorbencies.

It is envisaged that instead of the tube 2 being an integer separate from the plant container 10 it could instead be incorporated in a specially formed plant container having its own reservoir of water provided therein, suitably at the top or side thereof, with a tube 2 extending therefrom within the container itself.

Furthermore, instead of the sharpened end 7 being provided for the tube 3 it is envisaged that it could be in the form of a coil for mounting around the roots of a plant 12 or around the outer edge of a plant container 10.

In further applications it is envisaged that the tube 2 could be fed around the inside of a container or bag.

Turning now to FIGS. 3 to 6 of the accompanying drawings, in another embodiment of the invention a liquid reservoir is provided in the form of a fillable elongate bag 20. The bag 20 is suitably formed as a hollow tube with its ends 21 heat sealed and at a central portion thereof by heat sealing 32 and 33 a port or spout 23 is formed.

For use with conjunction with the bag 20 a tube 22, similar to the tube 2 of FIGS. 1 and 2, may be used. This tube 22 as shown in FIGS. 4 and 5 comprises an outer liquid impermeable layer with extending therethrough a water absorbent or hydrophillic material 28 such as compressed paper, fibre wadding, felt or sponge, one end of which extends outwardly from the end of the tube 22 and the opposite end of which 28' stops a short distance from the sharpened end 27 of the tube 22.

Figure 5:
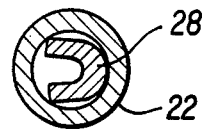
FIG. 5: shows, diagrammatically, a cross-sectional view along arrows B—B of FIG. 4.

As seen in FIG. 5 the substantially rectangular strip of material can be compressed so as to fit within the substantially circular tube 22.

Alternative constructions including the integral formation of the tube 22 about a complete core of material 28 such as hereinbefore mentioned will be readily apparent.

In use, when it is required to provide an automatic watering of a tree or shrub it will first be ensured that the surrounding ground is free from any objects that may puncture the bag 20. The bag will then be lain on the ground in front of the tree or shrub with the spout 23 facing away from the tree or shrub. The bag 20 can then be filled with water including fertilizer or other required additives as may be necessary.

Once filled the ends of the bag 20 forming legs 24 can be slid around the tree or shrub 30 with its supporting stake 29 and a point 25 can be formed as shown in FIG. 6 by holding the spout 23 upwards and drawing the bag 20 below in an outward direction. It should be ensured that the bag 20 folded in this manner is so positioned that the spout 23 is at the highest point and water does not run out. On extreme slopes stakes may be needed to hold the bag 20 in position. The forming of the pointed end 25 in the folded bag 20 tensions the edges 26 leading to the spout 23 such that the opening through the spout 23 into the interior of the bag 20 is closed off, so as to provide a self-sealing thereof.

A pointed stick can then be inserted into the ground to make a 4 inch to 6 inch hole into the root zone. The pointed end 27 of the tube 22 can then be inserted into the hole so formed for approximately 3 inches so as to lie adjacent the roots 31 of the plant 30 and the ground around the tube can then be firmed back into place. The opposite end of the tube 22 can then be inserted into the spout 23 ensuring that the projecting portion of the absorbent material 28 reaches well into the water contained within the bag 20.

The flow of water through the tube 22 will be governed by the height of the arc of the tube 22 above the bag 20. It will be found for example that with the tube 22 lying flat on top of the bag 20, water could for example be provided for 8 to 10 weeks. However, by raising the tube 22 into the position shown in outline and referenced 22' so as to form an arc above the bag 20, this will decrease the flow of water and extend the supply of water for up to 10 to 12 weeks.

It will thus be seen that the automatic and controlled watering of a tree or shrub 30 can be achieved. Moreover the bag 20 will act to draw water from the water table so as to enhance the supply of water in the soil surrounding the roots 31. The flow of water can, as will be appreciated from the above be varied to suit the size of plant and adjusted as the plant grows and it can also be varied dependent on the length of time that the water in the reservoir 20 is required to last. Furthermore, when refilling of the bag 20 is needed then a hose can be speedily and effectively inserted into the spout 23 for this to be effected.

Liquid fertilizer, fungicide and other additives can be provided in liquid form within the bag 20.

The bag 20 is suitably formed from high impact polythene and may hold any desired volume of water e.g. 5 gallons. In place about a plant it is seen to act as a mulching agent and windbreak as well as supplying water or plant nutrients. It also provides for grass and weed control and moisture retention around the plant 30 temperature enhancement above and around its root system and also provides support for the plant.

Furthermore, the water absorbent or hydrophilic material 28, suitably an elongate thin wad or "sponge" if cellulose fibres such as that manufactured and sold in sheet or "sponge cloth" form under the registered trade mark WETTEX, provides an automatic filtering of the water as it flows from the reservoir to the soil. Thus it is seen that as a tree or shrub can be protected and watered automatically, the planting of same at any time of the year and their growth through the hottest summer months can be achieved.

Where in the foregoing description reference has been made to specific components or integers of the invention having known equivalents then such equivalents are herein incorporated as if individually set forth.

Although this invention has been described by way of example and with reference to possible embodiments thereof it is to be understood that modifications or improvements may be made thereto without departing from the scope of the invention as defined in the appended claims.

I claim:

1. An automatic and controllable liquid supply apparatus comprising a liquid reservoir for containing a predetermined volume of liquid and a liquid transfer means comprising an elongate tubular member of a liquid impermeable material containing a continuous length of an absorbent or hydrophilic material extending between liquid inlet and liquid outlet end portions of said tubular member, said liquid inlet end portion providing contact between said absorbent or hydrophilic material and said liquid in said reservoir so that liquid can be transferred by said absorbent or hydrophilic material to said liquid outlet portion, the reservoir comprising an elongate liquid-fillable bag having a spout or port section which the liquid inlet end portion of said liquid transfer means is inserted, said bag being folded to form a pair of liquid containing legs said legs lying underneath said port section and arranged mutually parallel and mutually engageable so as to be capable of encompassing and supporting a single tree or shrub therebetween, said liquid outlet end portion of said liquid transfer means being insertable into the ground in the root zone of said single tree or shrub to feed said liquid thereto.

2. Apparatus according to claim 1, wherein said spout or port is defined along one edge of said bag at a substantially central portion thereof, said edge being placed under tension when said legs are formed such that said spout or port is automatically sealed against egress of said liquid therefrom.

3. Apparatus according to claim 1, wherein said spout is disposed higher than a bottom surface of said bag, said tubular member extending downwardly between said bag legs.

4. Apparatus according to claim 1, wherein said tubular member is flexible to vary its vertical arc and thereby change the rate of water flow.

* * * * *